March 17, 1936.  G. E. BRONSON  2,034,558

FLEXIBLE HOSE SUPPORT

Filed Aug. 11, 1934

INVENTOR
George E. Bronson
BY
Wooster & Davis
ATTORNEYS.

Patented Mar. 17, 1936

2,034,558

UNITED STATES PATENT OFFICE 2,034,558

FLEXIBLE HOSE SUPPORT

George E. Bronson, Beacon Falls, Conn., assignor to The American Brass Company, Waterbury, Conn., a corporation of Connecticut Application August 11, 1934, Serial No. 739,386

11 Claims. (Cl. 138—61)

This invention relates to new and useful improvements in flexible hose supports and has for an object to provide a means for supporting a flexible hose, such for example as is used to connect a pair of platens in a press for moulding articles of plastics for the steam supply to them, in a manner that the formation of water pockets in the hose will be prevented and that the hose will be self draining.

Another object is to provide a support which will cause a distribution of the flexing of a hose used for the purpose stated and cause the hose to flex in only one plane thereby preventing twisting and increasing the life of the hose.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

Figure 1:
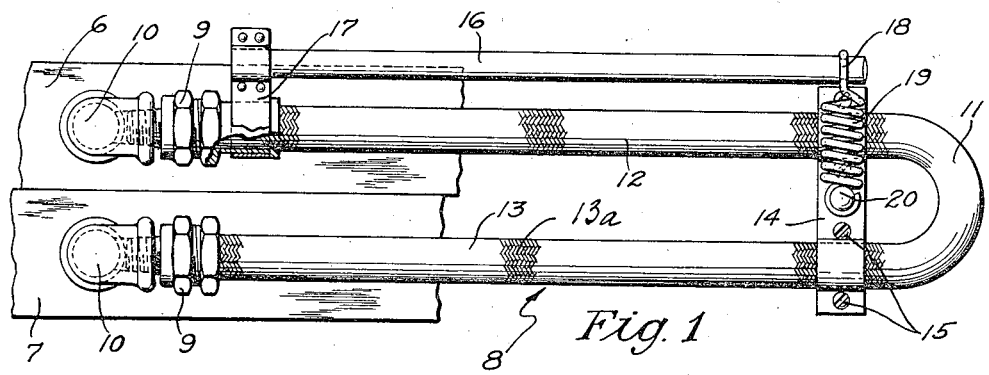
Fig. 1 is a side elevational view of the means of the invention attached to the closed platens of a press.
Figure 2:
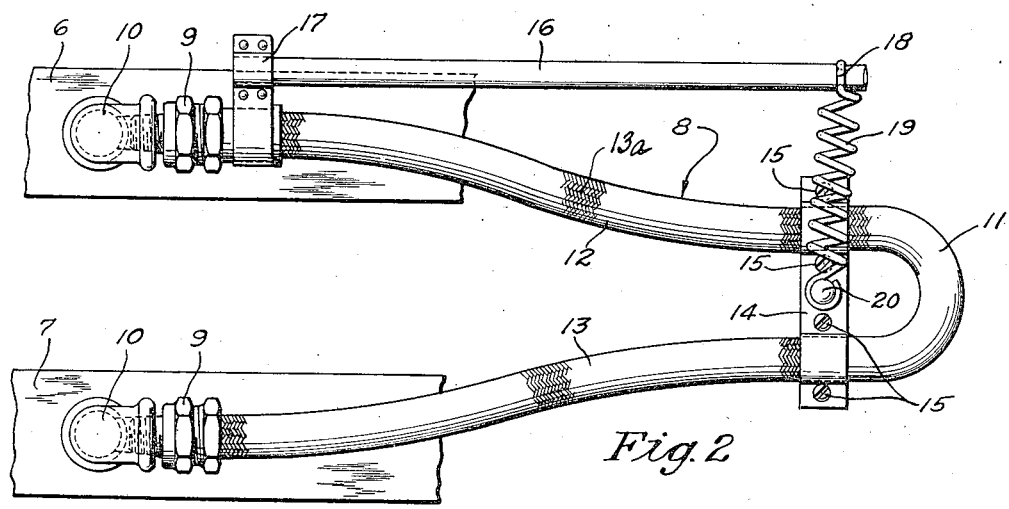
Fig. 2 is a similar view, the platens being open.
Figure 3:
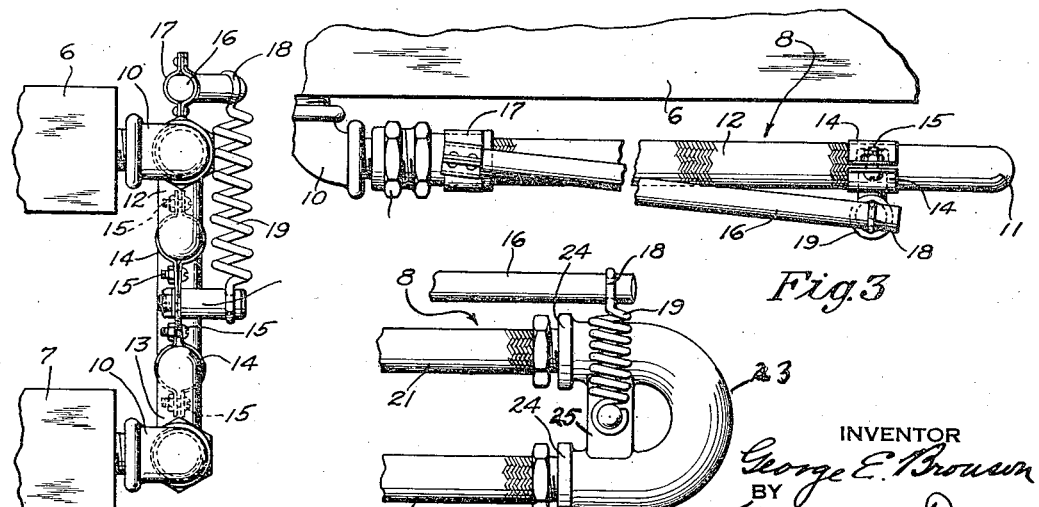
Fig. 3 is a top plan view of the device as in Fig. 2.
Figure 4:
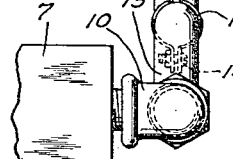
Fig. 4 is an end view looking from the left in Fig. 2.

In platen press constructions for the moulding of articles of bakelite or other mouldable material, either one or both of the platens are movable so that the press may be opened and the upper and lower platens of a press are connected by a flexible hose for the steam supply. The platens are usually heated by steam supplied to one platen by a suitable supply connection, not shown, and passes from this platen to the other by means of a flexible hose connected between the two platens. The flexible hose connection permits of relative movement of the platens, but where the hose is simply looped to permit of movement of the platens and is unsupported except where connected with them, portions of the hose drop lower than the connections between the hose and platens thereby forming water pockets or traps which interfere with the proper circulation or passage of the steam. The present invention provides means to support the hose in such a manner that water pockets cannot be formed and that the hose is self draining and will yet permit of the required movement of the platens to which the hose is coupled.

Referring in detail to the drawing, the upper and lower platens of a press are indicated at 6 and 7, and a substantially U-shaped means 8 as a flexible hose or tubing, is connected at its respective ends to said platens as by suitable couplings 9 through elbow connections 10. In Figs. 1 through 4, the means 8 comprises a length of flexible hose, such for example as a flexible metal hose including a braided wire covering 13a or any other suitable type of hose looped or doubled upon itself intermediate its ends providing an intermediate bent or U-shaped portion 11 and upper and lower arms 12 and 13 connected with the respective platens as described. A pair of similar metal straps 14 are arranged one at each side of the intermediate portion of the connector 8 and these straps are each adjacent both of its ends bent outwardly whereby the pair of straps when drawn together embrace the portions of the arms 12 and 13 adjacent the intermediate or U shaped portion 11 of the means 8 as shown. Bolts 15 are used to secure said arms together and about the embraced portions of the means 8 and it will be appreciated that in this construction the straps form a clamp on the means 8 securing it in its U shape and that the portions of said straps intermediate the arms of said means is in the nature of a web.

A bar 16 extends in a direction lengthwise of the arm 12 and as here shown the bar is arranged above said arm and at its forward end or at one end is secured to the upper coupling 9 as by a clamp 17 tightly secured in any desired manner to said upper coupling and to the end of the bar whereby the latter is rigidly mounted. To the opposite or free end of the bar 16 is secured or hooked the upper end 18 of a coil spring 19 and the lower end of such spring is hooked over or secured to a stud or pin 20 carried by the intermediate or web portion of the straps 14.

From the foregoing it will be clear that when the platens are closed as in Fig. 1 the hose is so supported that all its portions are above the lower coupling 9. This is true since the bar 16 is rigid and is rigidly supported and the spring 19 is anchored at its upper and lower ends to the free end of the bar and the bent or U-shaped intermediate portion of the means or hose 8. When the platens move apart as in Fig. 2 the clamp or bracket 17 carries the bar 16 upwardly if the upper platen is moved or holds such bar stationary if only the lower platen is moved. If both platens move or if only the upper platen moves the bar 16 is carried upwardly and draws upwardly on the end 18 of the spring 19 and through the spring raises the intermediate or U-portion of the means 8 into the position shown in Fig. 2. It will, therefore, be clear that the bar and spring will act to maintain the intermediate portion of the hose or means 8 in a position above the position of the lower coupling 9 and none of it will be carried above the connection to the upper platen whereby the means or hose 8 will drain itself and the upper platen and water pockets will not be formed in them.

Figure 5:
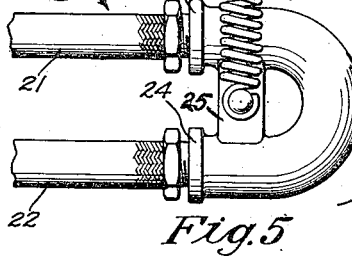
Fig. 5 is an elevational view illustrating a slight modification.

Fig. 5 suggests a slightly modified construction and in this figure the means 8 instead of being formed of a single length of hose is formed of separate lengths of hose 21 and 22 connected by a U-shaped metal part or casting 23 connected with the outer ends of the sections or arms 21 and 22 as at 24. Preferably the casting 23 has a web-like portion 25 cast therewith and to which may be connected the lower end of the spring 19. From this it will be understood that the only difference between the arrangement of Fig. 5 and that of the figures first described is that in the modification the casting 23 constitutes the U or intermediate portion of the means 8 and that separate sections or lengths of hose 21 and 22 form the upper and lower arms of said means.

It will be noted that the means 8 together with the couplings 9, clamp 14, bar 16 and spring 19 form a unit and that when in position connecting a pair of relatively movable elements, as the platens 6 and 7, the said unit is self draining and that there is no chance of a water pocket or trap being formed in the tubular portion or means of the unit. With the present means the life of the hose will be increased due to the fact that all of the flexing does not take place at one point but is properly distributed, and further due to the fact that the hose flexes in but one plane, twisting being avoided. With this unit, a single length or piece of hose may be used as in Figs. 1 through 4 thus reducing the number of couplings required and consequently decreasing the cost. Attention is also directed to the fact that both sections, or both the upper and lower arms of the hose flex so that the flexing is equally distributed and it will further be seen that the present unit extends along substantially horizontally and directly at the sides of the platens and is relatively flat and does not project laterally of the platens for any appreciable distance so that very little space is taken up by the unit.

Having thus set forth the nature of my invention, what I claim is:

1. In a connection of the class described, a substantially U-shaped tubular connecting means of which the arms for the greater portions of their lengths comprise flexible hose, a bar secured at one end to one of said arms and extending toward the U-portion of said means, and a coil spring connected at its respective ends to the other end of said bar and the U-portion of said means.

2. In a connector of the class described, a length of flexible hose bent to substantially U-shape, a support secured at one end to the upper arm of said hose, a clamp on the intermediate portion of said length of hose, and a spring connected at its respective ends to said clamp and the other end of said support.

3. In a connector of the class described, a length of flexible hose bent to substantially U-shape, a clamp on the intermediate portion of the hose and engaging both arms thereof and securing the said portion of the hose in U-form, a bar secured at one end to the upper arm of the hose and extending lengthwise of said arm, and a coil spring connected at its respective ends to said clamp and the other end of said bar.

4. In a connector of the class described, a length of flexible hose bent to substantially U-shape, a clamp comprising a pair of straps extending between and disposed against opposite sides of both arms of the hose adjacent its bend and securing said arms in spaced relation and the bent portion of the hose in U form, a support secured at one end to the upper arm of the hose and extending lengthwise of said arm, and a coil spring secured at one end to the other end of said support and at its other end to the portion of the clamp between the arms of the hose.

5. In a connection of the class described, a substantially U-shaped tubular connecting means of which the arms for the greater portions of their lengths comprise flexible hose, a support secured at one end to one of said arms and extending toward the U-portion of said means, a web extending between said arms adjacent the U portion of the means, and a coil spring connected at its respective ends to the other end of said support and to said web.

6. The combination of a flexible tube, said tube bent upon itself to substantially U form, a bar connected at one end to the free end of the upper arm of the tube and extending in the direction of the length of said arm, means securing said tube in U form, and a coil spring connected at its respective ends to the other end of said bar and the U portion of the tube.

7. In combination with a pair of upper and lower members of which one is movable relative to the other, a tubular connection between said members for a steam supply, said connection comprising a substantially horizontally disposed U-shaped means of which the arms are of flexible hose coupled at their free ends with the respective members, a bar having one end fixed with respect to the upper of said members, and a coil spring connected at one end with said bar and at its other end with the U-shaped portion of said means.

8. In a connector of the class described, a length of flexible hose bent to substantially U-shape, a bar secured at one end to the upper arm of said hose, a clamp on the intermediate portion of said length of hose and holding it to said U-shape, and means connecting said clamp with the other end portion of said bar.

9. In a connection of the class described, a substantially U-shaped tubular connecting means of which the arms for the greater portions of their lengths comprise flexible hose and arranged one above the other, coupling means at the free ends of the arms, and a spring support carried by the upper arm adjacent its coupling means and connected to the U-shaped portion to support it.

10. In a connector of the class described, a length of flexible hose bent to substantially U-shape and arranged with its arms one above the other, coupling means at the free ends of the arms, a clamp adjacent the loop in the hose, a support connected to the coupling means of the upper arm, and a spring carried by said support and connected to the clamp to support the looped end of the hose.

11. In combination with a pair of upper and lower members of which one is movable relative to the other, a tubular connection between said members for a steam supply, said connection comprising a substantially horizontally disposed U-shaped means of which the arms are of flexible hose coupled at their free ends with the respective members, and a yieldable spring support connected at one end in fixed relation to the upper of said members and connected at its other end to the U-shaped portion of the tubular connecting means to support it.

GEORGE E. BRONSON.